United States Patent [19]

Hope et al.

[11] 4,118,998

[45] Oct. 10, 1978

[54] TRANSPORT ROLLER RACK

[76] Inventors: Henry F. Hope, 3192 Huntingdon Rd., Huntingdon Valley, Pa. 19006; Stephen F. Hope, 2548 Wyandotte Rd., Willow Grove, Pa. 19090

[21] Appl. No.: 819,126

[22] Filed: Jul. 26, 1977

Related U.S. Application Data

[63] Continuation-in-part of Ser. No. 780,922, Mar. 24, 1977, which is a continuation-in-part of Ser. No. 737,199, Oct. 29, 1976, which is a continuation-in-part of Ser. No. 555,961, Mar. 10, 1975, Pat. No. 3,989,176, which is a continuation-in-part of Ser. No. 457,829, Apr. 4, 1974, abandoned, and Ser. No. 513,244, Oct. 9, 1974, Pat. No. 3,952,610.

[51] Int. Cl.[2] ................................................ F16H 1/12

[52] U.S. Cl. .................................................. 74/421 R

[58] Field of Search .......................... 74/421 R, 412 R

[56] References Cited

U.S. PATENT DOCUMENTS 3,952,610 4/1976 Hope et al. ........................ 74/421 R

*Primary Examiner*—Leonard Hall Gerin

[57] ABSTRACT

A transport roller rack for automatic film developing machines, which employs gear driven rollers arranged in a staggered pattern, and spaced so closely together that the film follows nearly a straight path between the rollers. This renders the rack more jam-proof, and frees it of any need for stationary film guidance means, but on the other hand materially increases the number of rollers to be driven. A highly efficient gear drive is used which easily handles the increased number of rollers, and whose construction also eliminates any proglem of binding between the gears driving adjacent rollers which rotate in the same direction.

Each roller has a driving gear at its end. Every other pair of adjacent rollers rotating in mutually opposite directions have these driving gears at the same given ends and is mesh with each other. The intervening pairs of adjacent rollers rotating in mutually opposite directions have their driving gears at the ends opposite the said girven ends, and also in mesh with each other. Thus, alternate pairs of counter-rotating rollers are driven by corresponding pairs of roller driving gears but from opposite sides of the rack.

21 Claims, No Drawings

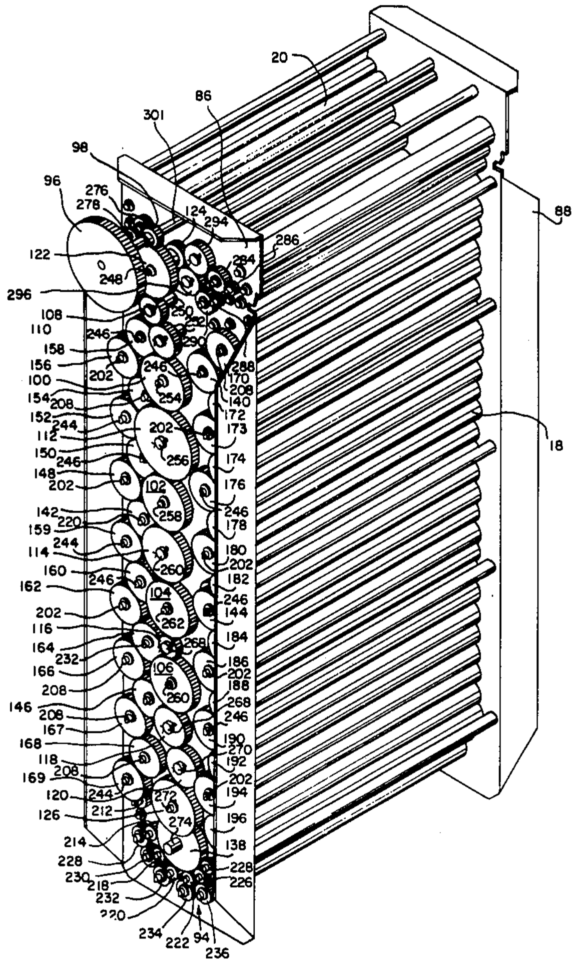

FIG. 11
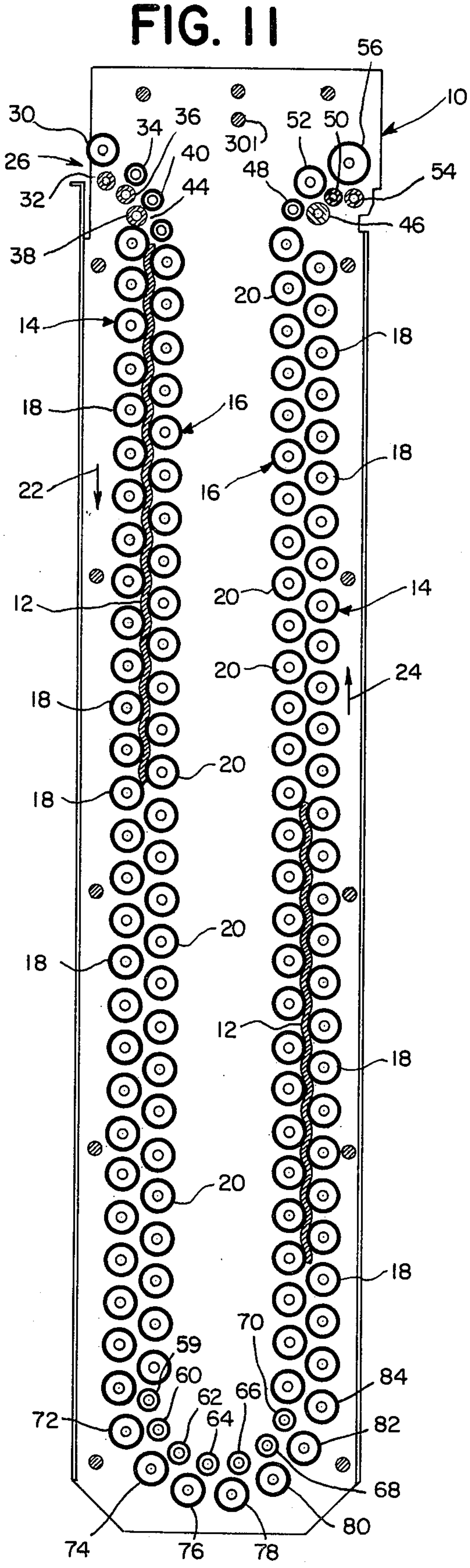
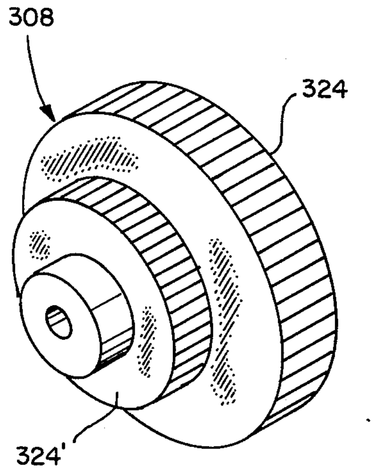
FIG. 12

TRANSPORT ROLLER RACK

RELATED CASES

This application is a continuation-in-part of our co-pending United States patent application Ser. No. 780,922, filed Mar. 24, 1977, which is a continuation-in-part of our patent application Ser. No. 737,199, filed Oct. 29, 1976, which in turn is a continuation-in-part of our patent application Ser. No. 555,961 filed Mar. 10, 1975 now U.S. Pat. No. 3,989,176, issued Nov. 2, 1976. The said application Ser. No. 555,961 in turn is a continuation-in-part of our patent applications Ser. No. 457,829, filed Apr. 4, 1974, now abandoned, and Ser. No. 513,244, filed Oct. 9, 1974, now U.S. Pat. No. 3,952,610, issued Apr. 27, 1976.

In the foregoing, prior patent applications and now issued patents, there is taught a highly efficient, novel concept for powering racks containing long strings of transport rollers. In accordance with that concept, each roller is coaxially rotated by its own roller drive gear. Clusters of these roller drive gears are driven by respective cluster drive gears. The cluster drive gears, in turn, are coaxially rotated by power transmitting gears of larger pitch diameters.

The power transmitting gears drive each other, thereby providing the main flow of power to the rack. Each cluster drive gear taps off from this main flow of power the fraction needed to drive its own cluster of gears and their coaxially driven transport rollers.

The present invention involves a still further utilization of this novel concept, in conjunction with other techniques with which it cooperates in a highly advantageous manner. Thus the present invention further demonstrates the broad scope of useful applicability of the above-mentioned concept.

BACKGROUND OF THE INVENTION

The present invention relates generally to apparatus suitable for transporting elongate webs or sheets of materials through one or more treatment baths. The apparatus is particularly suitable for use with photographic film developing machinery.

Machines are known which utilize an extended transport roller system for carrying flexible work pieces, such as photographic films or papers. Typical of such machines are those used to develop photographic film. These machines employ a series of treatment baths through which the films are carried in succession by means of transport roller racks which extend downwardly into the treatment bath tanks. The transport roller racks serve to automatically carry the films in a generally U-shaped path through each of the treatment bath tanks. After leaving the last of these tanks, the films pass through another transport roller rack or dryer rack within which they are subject to air flow and sometimes to heat in order to dry the films before they exit from the development machine.

When transporting film through transport roller racks, it has been customary to provide a string of rollers suitably positioned in the rack to transport the film downwardly through a vertically elongated path. The film is then directed through a plurality of turnabout rollers which are positioned near the bottom of the rack and thence urged upwardly through a second vertically elongated path provided by another roller string. Various roller string configurations have been used. On form frequently encountered utilized rollers arranged in a staggered pattern, without forming nips, thereby defining a sinusoidal path for the film between consecutive rollers displaced alternately to one side and the other of the general direction of film movement.

In transport roller racks using such staggered roller pattern, it has been customary to position the rollers at such distance from one another that the individual driving gears at their ends would mesh in a staggered pattern corresponding to that of the rollers themselves. In this way, the gear meshings were between consecutive rollers rotating in mutually opposite directions, and such meshings did not interfere with either gear or roller rotation. On the other hand, as between consecutive rollers rotating in the same direction, the spacing had to be made larger. Large enough in fact to preclude the respective roller driving gears from contacting, let alone meshing; otherwise free rotation of gears and rollers driven thereby would have been impeded. Such spacing relationships are observable, for example, in the above-identified parent applications Ser. Nos. 737,199 and 780,922.

SUMMARY OF THE INVENTION

While such rack constructions, particularly when utilizing the gear drive techniques which also characterize the inventions covered in said parent applications, are highly satisfactory, we have now recognized that a still further improvement can be realized as described later in this Specification.

It has been noted above that, in roller racks using a staggered, non-nip forming roller train, the spacing between consecutive rollers on any one side of the film being transported has had to be larger than the spacing between consecutive rollers measured diagonally across the film. We have recognized that further reduction of the spacing between rollers on the same side of the film, preferably to a spacing at least as small as that between rollers diagonally across the film, would be desirable in two respects. First, it would make it possible to reduce the degree of sinusoidal curvature introduced into the film as it is transported through the staggered roller train. By enabling the film to follow a straighter path, there would be less strain on the film, and particularly its delicate emulsion side. There would also be less tendency for the leading edge of the film to become "hung up" on rollers toward which it is deflected as it bends around preceding rollers. Finally, there would be less tendency for the bent film to escape through the spaces in question from its desired path between the staggered rollers.

Acting together, these effects also eliminate the need for stationary film guidance means which had sometimes been provided between adjacent rollers in this type of rack.

Narrowing the spacing between consecutive rollers on each side of the film, as discussed above, brought with it two problems. First, it meant that the gear driving system had to be so constructed that the gears driving those consecutive rollers (which rotate in the same direction) would not jam one another. Secondly, it meant that, unless the roller diameters were increased, which would have counteracted the desired beneficial effects, the number of rollers in a rack of given path length increased. This placed an even greater premium on the efficiency of the gear system driving the rack. All of these problems are overcome by our present invention.

In accordance with that invention, there is provided a rack of gear driven rollers arranged in staggered pattern without forming nips, and spaced so closely together that the film follows a nearly straight path between the rollers.

Each roller is rotated by a driving gear at its end. Every other pair of adjacent rollers rotating in mutually opposite directions have these driving gears positioned at one side of the rack and in mesh with each other. The intervening pairs of adjacent rollers rotating in mutually opposite directions have their driving gears positioned at the other side of the rack and in mesh with each other. Thus, alternate pairs of counter-rotating rollers are driven by corresponding pairs of roller driving gears, but from opposite sides of the rack.

In this way, interference is averted between adjacent driving gears rotating rollers in the same direction, even though these rollers are now very close to each other.

Extending along the roller driving gears at each side of the rack is a train of larger diameter gears, meshing with each other in a staggered pattern. These will be referred to as the intermediate power gears. Consecutive ones of these intermediate power gears coaxially rotate roller driving gears in consecutive meshing pairs of such gears positioned on the same side of the rack.

Extending along the intermediate power gears is a train of still larger diameter power gears, which drive one another by meshing. These will be referred to as the main power gears. Different ones of these main power gears coaxially rotate smaller gears, and these smaller gears, in turn, rotate by meshing the intermediate power gears. These smaller gears which are coaxially rotated by the main power gears are referred to hereafter as the main cluster drive gears.

The main flow of power is transmitted along the rack by the main power gears. At each coaxial connection of a main power gear to a main cluster drive gear a fraction of this main power is tapped off. In turn, at each coaxial connection of an intermediate power gear to a roller driving gear, a fraction of that fraction of the main power is tapped off. In each case, the tapped-off power is just enough to drive the group (or cluster) of gears being rotated, and the number of gear meshes in each tap-off is also kept at a minimum.

In terms of the teachings of our parent applications, of which this application is a continuation-in-part, the present invention constitutes a further ingenious utilization of the highly efficient concept of using multiple tiers of gears, one to transmit the main flow of power, and another to progressively tap off therefrom fractions of that main power flow through coaxially rotated cluster drive gears to groups, or clusters of gears, which are thereby driven with high efficiency of power utilization, great smoothness, and low wear.

In the present invention, the main power gears constitute one such tier. The main cluster drive gears and the intermediate power gears rotated thereby constitute a second tier, and the roller driving gears themselves constitute a third tier.

It should be noted that, as between the main and intermediate power gears, the latter constitute in effect clusters of driven gears deriving their power from the main power gears through progressive tap-offs provided by the main cluster drive gears.

On the other hand, with respect to the actual roller driving gears, these intermediate power gears provide the main flow of power, and fractions of this are in turn progressively tapped off by coaxially rotated roller driving gears, each meshing pair of such roller driving gears then constituting a cluster deriving its power fraction from an intermediate power gear.

It is therefore an object of the present invention to provide a transport roller rack, particularly for transporting photographic film which is greatly improved in a number of important respects.

It is another object of the present invention to provide a novel transport roller rack which does not require guides or vanes for film guiding purposes.

It is another object of the present invention to provide a novel film transport roller rack that employs a greatly increased number of transport rollers in close proximity to each other.

It is another object of the present invention to provide a novel transport roller rack in which an exceptionally large number of transport rollers can be utilized without requiring excessive driving power.

It is another object of the present invention to provide a novel film transport roller rack which employs an exceptionally large number of transport rollers in a smoothly functioning manner without causing chatter, vibration or other action harmful to the film emulsion.

It is another object of the present invention to provide a novel film transport roller rack in which a large number of pairs of transport rollers are employed to define the film path and to both drive and guide the film through the rack.

For further details, reference is made to the following description and claims, in the light of the accompanying drawings, wherein like reference characters refer to similar parts throughout and in which:

BRIEF DESCRIPTION OF THE DRAWINGS

FIG. 11 is a cross-sectional view taken along Line 11—11 of FIG. 1, looking in the direction of the arrows.

FIG. 12 is an enlarged, perspective view showing a coaxial power gear.

DESCRIPTION OF THE PREFERRED EMBODIMENTS OF THE INVENTION

Figure 1:
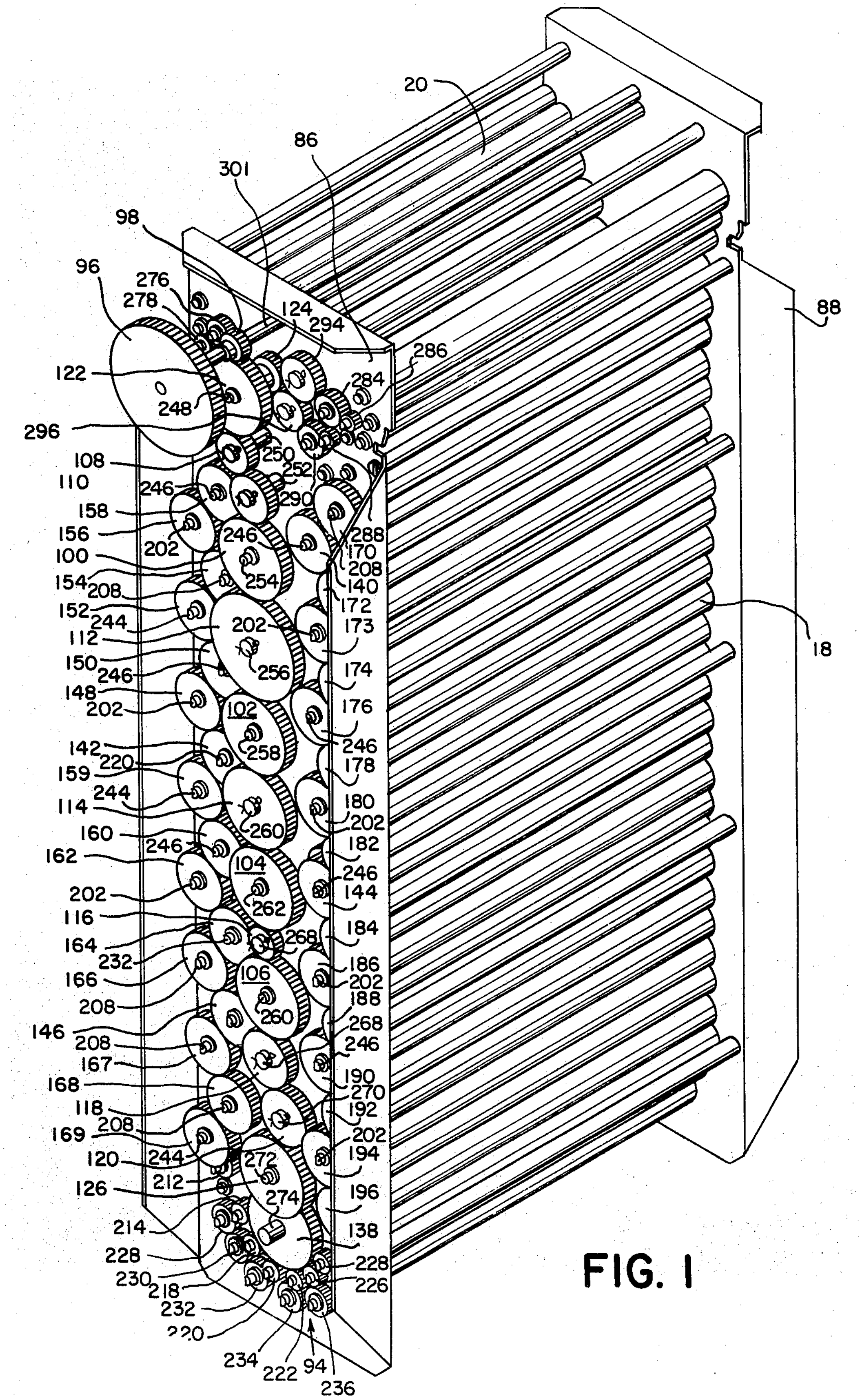
FIG. 1 is a perspective view of the transport roller rack embodying the present invention, viewed from drive side.

Referring now to the drawings, there are illustrated in FIGS. 1–11 various views of the same transport roller rack 10, which is adapted to be installed, for example, in a photographic film developing machine (not shown) and to transport strips of film through the various treatment baths required in the film development process.

As best seen in FIG. 11, the transport roller rack 10 includes a plurality of rollers arranged in a generally U-shaped configuration comprising an inlet leg, a bottom turnabout and an outlet leg, whereby film 12 or other elongated strip material can follow automatically a U-shaped path through the rack. The rollers are arranged generally in two U-shaped sets or groups in parallel spaced rows comprising an outer row 14 and an inner row 16. Each of the legs of the U-shaped configuration is substantially identical in construction and operation and so need not be separately described. The outer row 14 of each of the legs comprises a plurality of rollers generally designated 18; the inner row 16 of each of the legs comprises a plurality of similar rollers generally designated 20.

The rollers 18 in the outer row 14 are staggered with respect to the rollers 20 forming the inner row 16. The relative positioning of these rollers, both horizontally and vertically is such that one row is staggered relative to the other and the strips or lengths of film or other materials 21 which are introduced between the adjacent inner and outer rows 14, 16 will be urged to follow a sinuous path, as shown in FIG. 11, as the material is transported through the transport roller rack 10 in the direction of the arrows 22, 24.

At the inlet end 26 of the transport rack 10 are rotatively positioned a plurality of inlet end rollers 30, 32, 34, 36, 38, 40 which may be arranged to form respective nips therebetween to serve as an automatic lead in for films or other materials 12 to be transported by the transport rack 10 through the associated treatment baths (not illustrated). The films 12 emerging from the nips of the rollers 30, 32, 34, 36, 38, 40 are directed into the space or film path 44 between the staggered rows of outer rollers 18 and inner rollers 20. The inlet end rollers 30, 32, 34, 36, 38, 40 serve to receive the film or other strip material 12 from other portions of the apparatus automatically and to propel automatically the films into the transport roller rack 10.

At the exit or outlet end 28 of the rack 10, a plurality of exit end rollers 46, 48, 50, 52, 54, 56 are provided which serve to direct the films or other materials 12 outwardly out of the rack 10 in a direction generally at right angles to the plane of travel as the films are transported through the outlet leg of the rack 10 in the direction indicated by the arrow 24. Some of the outlet end rollers 46, 48, 50, 52, 54, 56, 58 form nips with a complementary roller and serve to propel the film 12 emerging from after being transported through the transport roller rack 10 automatically out of the rack. Some of the inlet end rollers and some of the outlet end rollers may be fabricated of hard phenolic composition and soft, cooperating foam material in accordance with known practice to prevent chemical transfer between adjacent baths in a manner designed to accomplish the intended purpose without injuring the film emulsion.

A bottom turnaround system is illustrated comprising a plurality of interior rollers 59, 60, 62, 64, 66, 68, 70 and a plurality of outer rollers 72, 74, 76, 78, 80, 82 and 84. The interior and exterior rollers are arranged in staggered relationship in a U-shaped path to lead the film smoothly, evenly and automatically through the transition from the downward path of travel in the inlet leg as illustrated by the arrow 22 to the vertically upward path of travel as illustrated by the arrow 24 in the outlet leg of the rack. It will be noted that the inner bottom rollers 59, 60, 62, 64, 66, 68, 70 and the outer bottom rollers 72, 74, 76, 78, 80, 82, 84 are respectively arranged in staggered relationship to maintain a staggered alignment between the outer row of rollers and inner row of rollers respectively through the transport roller rack 10.

The outer rollers 18, inner rollers 20, the inner bottom rollers 59, 60, 62, 64, 66, 68, 70, the outer bottom rollers, 72, 74, 76, 78, 80, 82, 84, the inlet end rollers 30, 32, 34, 36, 38, 40 and outlet end rollers 46, 48, 50, 52, 54, 56 are all maintained in horizontal positions between a pair of spaced frame members 86, 88 and are mounted on shafts journalled for rotation within the frame members. All of the rollers illustrated in FIG. 11 are driven by gears which are respectively shown in FIGS. 1–10. It will be noted that the gears of the system are arranged adjacent either the drive frame member 86 or the drain frame member 88 and are generally positioned in three layers or tiers as will hereinafter more fully be explained.

The staggered rollers in the respective outer and inner rows 14, 16 and the rollers comprising the bottom automatic turnaround are so dimensioned that they do not touch, i.e., so that they do not form nips for the engagement of the materials or films 12 being transported by them. On the other hand, the respective roller driving gears attached to these rollers are so dimensioned and are so positioned that they do mesh along diagonal lines, but not vertically. In other words, an outer roller gear meshes with a diagonally adjacent inner roller gear, but not with its vertically adjacent gear or gears. The gear system is so interconnected that all gears will rotate in unison and so will the rollers to which they are attached. More particularly, if the outer roller gears rotate in a counter-clockwise direction, then the inner roller gears will rotate in the opposite or clockwise direction. The corresponding rotational movement will prevail for the rollers to which these gears are attached.

It will be apparent from FIG. 11 that the effect of the staggered locations of the outer row of rollers 18 and inner row of rollers 20 and the staggered arrangement of the inner bottom rollers and the outer bottom rollers is to define a sinusoidal film path 44. The staggered roller arrangement imparts a sinusoidal movement to the materials or films 12 which are introduced at the nips between the respective inlet end rollers, as the film is transported downwardly in the direction of the arrow 22 in the inlet leg, through the plurality of bottom turnabout rollers and between the respective outer and inner rollers 18, 20 comprising the outlet leg upwardly as indicated by the arrow 24.

Referring now to particularly FIGS. 1, 3, 5, 6 and 7, the gearing arrangement at the drive frame member 86 will now be described.

As illustrated, it will be observed that the gear system comprises generally three layers or tiers of gears, namely, an outer layer 90 comprising a plurality of large diameter power gears which mesh to transmit power through the length of the rack. An intermediate layer 92 of gears underlies the outer layer 90 and comprises a pair of generally similar, spaced gear trains designated 92A, 92B to respectively transmit rotative power to the groups of outer row rollers 18 and inner row rollers 20 which form the inlet leg and the outlet legs of the U-shaped film transport path through the rack 10. Underlying the intermediate layer of gears 92 is the inner layer 94 which comprises essentially smaller roller driving gears which gears are arranged in meshing pairs. Some of the pairs of roller driving gears are driven from power derived from the opposite or drain frame member 88 hereinafter more fully set forth. Gears positioned adjacent both the drive frame member 86 and the drain side frame member 88 have been provided because of the extraordinary number of rollers designed in the system.

Figure 3:
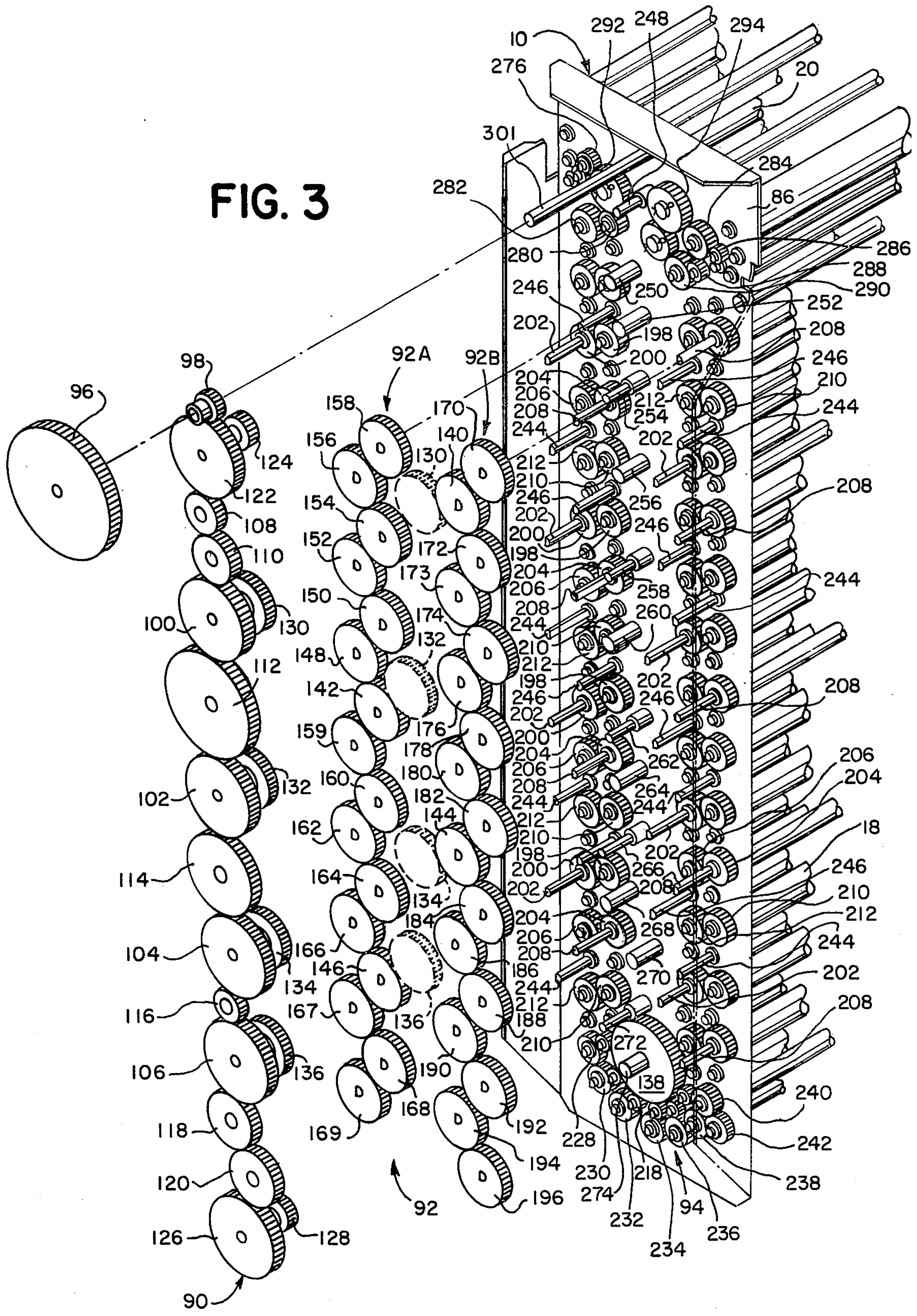
FIG. 3 shows a portion of the rack of FIG. 1, with parts exploded to show the three layers of gears comprising a portion of the power transmitting system.
Figure 5:
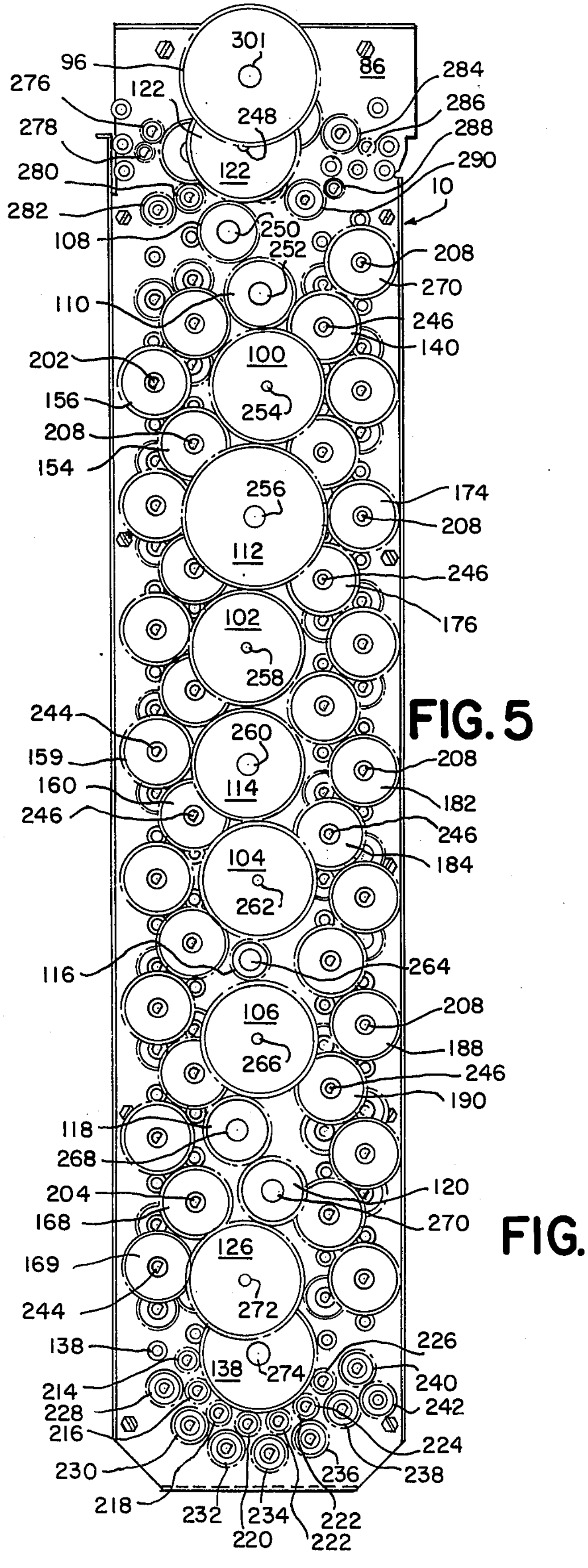
FIG. 5 is a side elevational view of the rack of FIG. 1, viewed from the same side as in FIG. 1.

As best seen in FIGS. 1, 3 and 5, power to the system is supplied through the main power gear 96 which is coaxial with the drive side pinion 98. The system power drive comprises the coaxial large diameter gears 100, 102, 104, and 106 in combination with the intermediate reversing and other associated gears 108, 110, 112, 114, 116, 118 and 120.

An upper coaxial gear comprising an outer layer power gear 122 and an inner layer drive gear 124 receives rotative power from the drive pinion 98 and powers the remainder of the gears in the outer layer 90 through mesh with the upper associated gear 108. The lowermost gear of the outer layer or tier 90 is similarly a coaxial gear comprising an outer layer power gear 126 and an inner layer drive gear 128 coaxially connected therewith.

Each of the large diameter coaxial power gears 100, 102, 104, and 106 respectively carries an intermediate layer drive gear 130, 132, 134, and 136 for powering the intermediate layer of gears 92 as hereinafter more fully described. Thus, it is seen that the outer layer 90 comprises a chain of power drive gears 98, 122, 108, 110, 100, 112, 102, 114, 104, 116, 106, 118, 120 and 126 which all actually lie in the outer layer or third layer remote from the drive side frame member 86. Intermediate layer gears 130, 132, 134, 136 (herein called cluster drive gears) are respectively coaxial with the power transmitting gears 100, 102, 104, 106 to rotatively drive through mesh the gears comprising the intermediate gear layer 92. It will be noted that a portion of the drive power is tapped off at each cluster drive gear to rotatively power a plurality of rollers.

The inner layer gear 124 which is coaxial with the uppermost outer layer or power gear 122 meshes with and drives gears which rotate some of the inlet end rollers and some of the outlet end rollers. The lowermost outer layer gear 126 is coaxial with and drives the inner layer gear 128. The inner layer gear 128 in turn meshes with the large, bottom turnaround gear 138 to rotate the bottom turnaround rollers in the manner hereinafter more fully set forth.

Driving power for the entire rack 10 is applied at the top of the rack through the main drive gear 96 from a motor through a suitable drive pinion (both not shown). This driving power then flows down through the outer layer 90 or the power drive gears along the drive frame member 86 to rotate the large diameter coaxial gears 100, 102, 104, 106 which will be referred hereinafter as the power transmitting gears or power gears for short. The intermediate gears 112, 114, 116 serve to reverse direction from one power gear 100, 104 to the next respective power gear 102, 106 so that all four power transmitting gears 100, 102, 104, 106 rotate in the same direction.

Through the coaxial connection between each power gear 100, 102, 104, 106 and the corresponding intermediate layer drive gear or cluster gear 130, 132, 134, 136, which it respectively rotates, there is tapped off a portion of the power flowing along the series of outer layer power gears. The tapped portions of the power are applied by the cluster drive gears to the other gears comprising the intermediate layer 92 and through them to the roller gears comprising the inner layer 94 for roller rotative purposes. These coaxial, intermediate layer drive gears 130, 132, 134, 136 will be referred to hereafter as the cluster drive gears. In this embodiment, it will be noted that these cluster drive gears do not directly drive any of the transport rollers. Rather, they transmit the power tapped off from the respective power transmitting gears 100, 102, 104, 106 through meshing to other gears in the intermediate layer of gears 92 which in turn drive gears which drive the transport rollers 18, 20.

Figure 6:
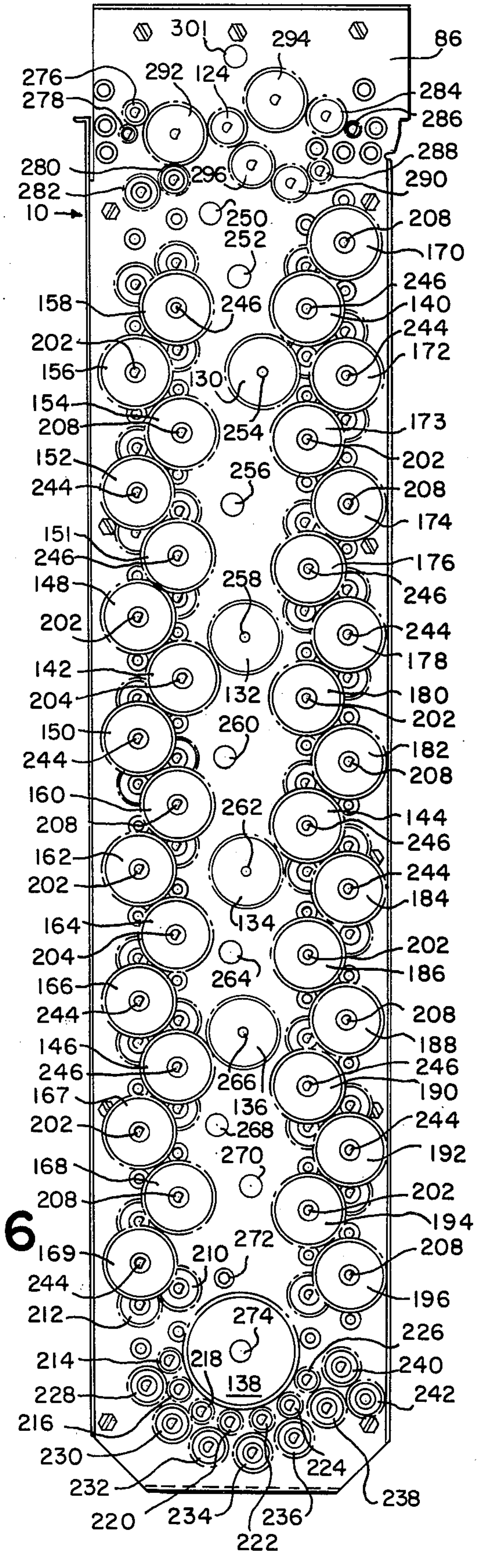
FIG. 6 is a side elevational view of the rack of FIG. 5 showing the underlying gear configuration with the large, power transmitting gears removed.

As best seen in FIGS. 3 and 6, the cluster drive gear 130 meshes with intermediate gear 140; the cluster drive gear 132 meshes with the intermediate gear 142; the cluster drive gear 134 meshes with the intermediate gear 144; and the cluster drive gear 136 meshes with the intermediate gear 146. Thus, it is seen that power tapped from the power transmitting gears in the outer tier 90 is applied to the intermediate layer 92 at four distinct locations, two locations being spaced along the inlet or down feed side of the roller system and two of the power taps being in mesh with the upfeed or outlet side of the rack.

It will be noted that the meshed intermediate gear 142 in turn meshes directly with intermediate gears 148, 150 and indirectly with intermediate gears 151, 152, 154, 156, 158, 160, 162. The meshed intermediate gear 146 in turn meshes directly with the intermediate gears 166, 167 and indirectly with gears 164, 162, 168, 169. Similarly, the meshed intermediate gear 144, meshes directly with gears 182, 184 and indirectly with the intermediate gears 186, 188, 190, 192, 194, 196, 180, 178, 176 which are respectively rotated thereby. The meshed gear 140 drives directly gears 170, 172 and indirectly gears 173, 174, 176. Accordingly, as the drive side pinion 98, is rotated by the main drive gear 96 to rotate the large power gears 100, 102, 104, 106, the cluster drive gears 130, 132, 134, 136 are rotated to rotate all of the intermediate gears comprising the intermediate layer 92, as viewed in FIG. 6. Thus it is seen that rotation of the main power train comprising the power gears 100, 102, 104, 106 which are situated in the outer layer 90 acts to supply power to the gears comprising the intermediate layer 92 in four separate, distinct, spaced locations through meshing of the coaxial cluster drive gears 130, 132, 134, 136.

Figure 7:
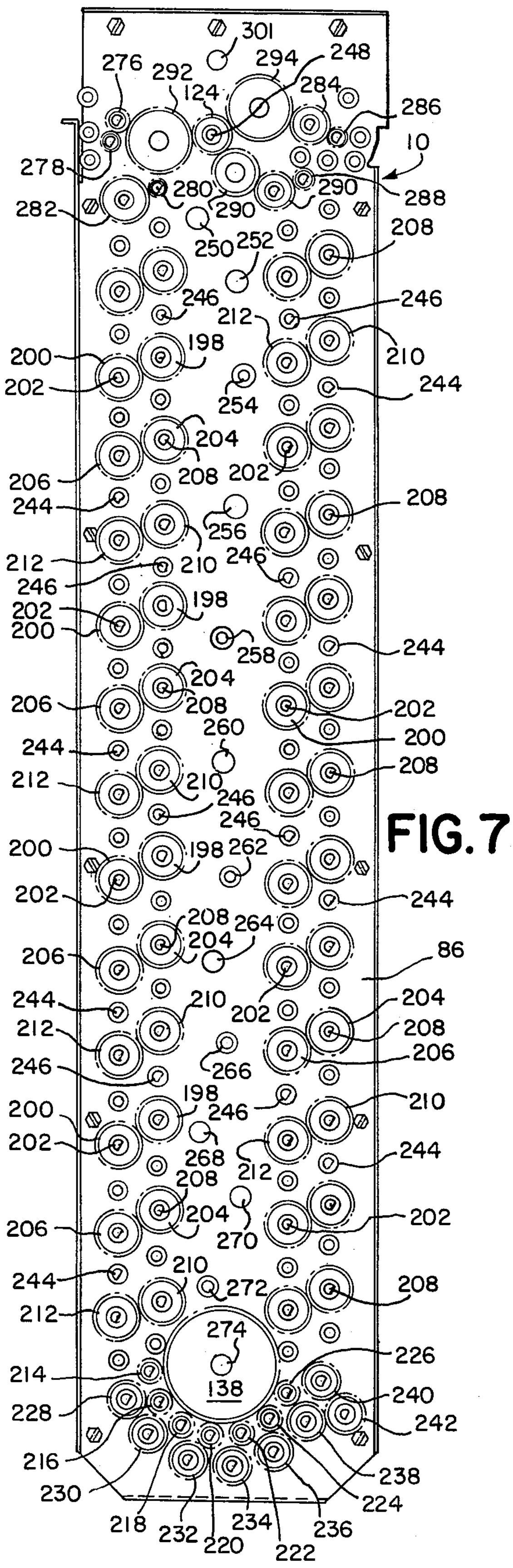
FIG. 7 is a side elevational view of the rack of FIG. 5 showing the underlying gear configuration with the first and second layers of gears removed.
Figure 8:
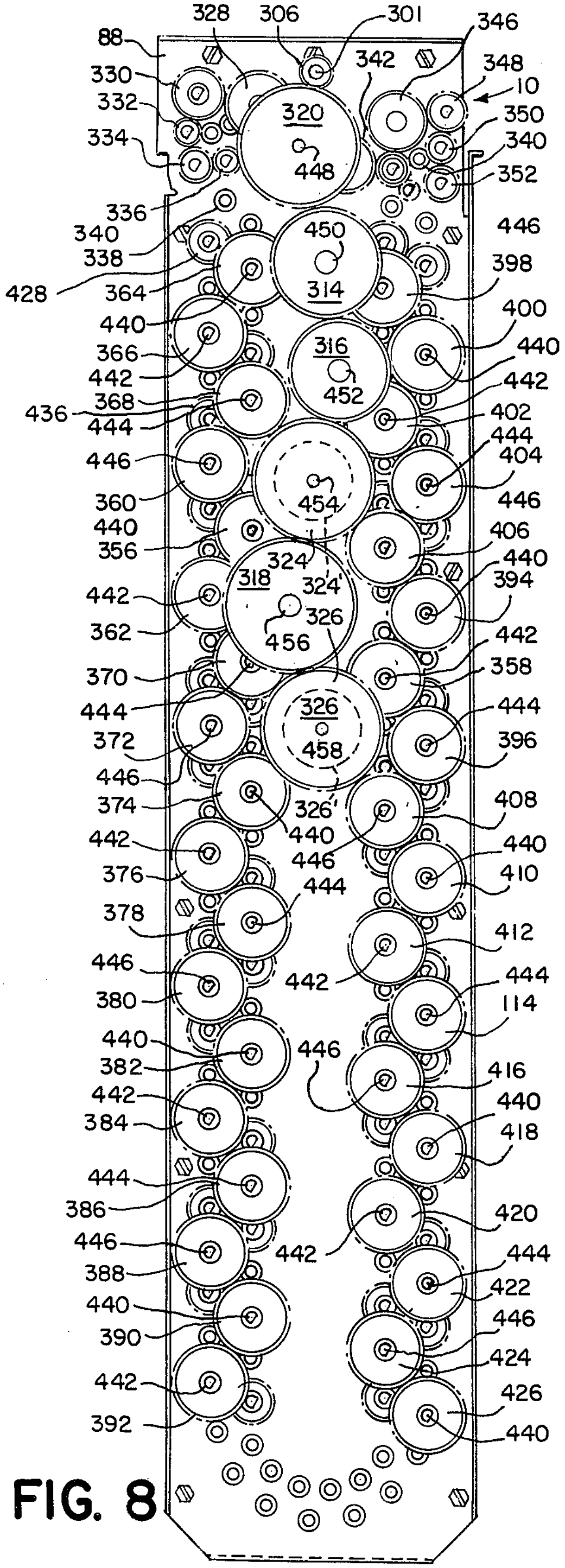
FIG. 8 is a side elevational view of the rack of FIG. 1, viewed from the same side as in FIG. 2.

Referring now to the inner layer of gears 94 as best seen in FIGS. 3 and 7, it will be noted that specified pairs of roller drive gears will be provided with one extended roller drive gear shaft, which shaft in turn is rotated by one of the intermediate gears. Specifically, the roller drive gears are arranged in meshed gear pairs 198, 200 and 204, 206.

A shaft 202 extends from the roller gear 200 sufficiently to carry the intermediate gear 156 and is rotated thereby. Similarly, the shaft 208 extends from the roller gear 204 and is engaged and rotated by the intermediate gear 154. Thus, the intermediate gear 156 and the roller drive gear 200 are coaxial on shaft 202 and rotate in unison as the shaft 202 is rotated. Similarly, the roller drive gear 204 and the intermediate gear 154 are coaxial on shaft 208 and rotate simultaneously as the shaft 208 is rotated. The roller gear paris 210, 212 have no shaft extensions and are rotated at their opposite ends by power supplied at the drain side frame member 88.

As best seen in FIG. 6, the intermediate gears 156, 148, 162, 167, 194, 186, 180, 173 serve as smaller power gears to coaxially transmit power to the roller drive gears 200 through the shafts 202, which gears then serve as small cluster drive gears. The intermediate gears 154, 160, 168, 196, 188, 182, 174, 170 also serve as smaller power gears to coaxially transmit power to the respective roller drive gears 204, which gears then serve as small cluster drive gears. The intermediate pairs of meshed roller gears 210, 212 are not equipped with shaft extensions and receive rotative power from the drain side of rack as hereinafter more fully set forth.

Still viewing the drive side as in FIGS. 1, 3, 5, 6 and 7, it will be observed that the bottom turnaround rollers 59, 60, 62, 64, 66, 68, 70, 72, 74, 76, 78, 80, 82, 84 are simultaneously driven through the large turnaround gear 138. The gear 138 meshes directed with and is rotated by the inner layer coaxial gear 128 as above set forth. The inner rollers 59, 60, 62, 64, 66, 68, 70 are rotatively drive by the inner roller drive gears 214, 216, 218, 220, 222, 224, 226. These inner roller drive gears all mesh directly with the large turnaround gear 138. The outer roller drive gears 228, 230, 232, 234, 236, 238 mesh respectively with inner roller drive gears and are rotated simultaneously thereby. The roller drive gear 240 receive rotative power through the reversing gear 242.

A plurality of vertically spaced, outer shafts 244 project outwardly from the drive side frame member 86 and rotatively carry the intermediate gears 152, 159, 166, 169, 172, 178, 184 and 192. Similarly, a plurality of vertically spaced inner shafts 246 extend outwardly from the drive side frame member 86 and rotatively carry other intermediate gears 158, 150, 160.

Still referring now to FIGS. 3, 5 and 6 it will be seen that the drive side frame member 86 carries a plurality of centrally positioned shafts 248, 250, 252, 254, 256, 258, 260, 262, 264, 266, and 268, 270, 272 which shafts respectively journal the gears 122, 108, 110, 100, 112, 102, 114, 104, 116, 106, 118, 120 and 126. Turnaround gear 138 rotates about the shaft 274. The large power gear 96 is affixed to the main power shaft 301, which shaft extends across the rack to supply power to the drain side at the affixed pinion gear 306.

Some of the inlet end rollers 30, 32, 34, 36, 38, 40 and outlet end rollers 46, 48, 50, 52, 54, 56 are directly connected to gears 276, 278, 280, 282 and 284, 286, 288, 290. The ears 276, 284, 290 mesh indirectly with the coaxial inner layer gear 124 through the reversing gears 292, 294, 280.

Figure 2:
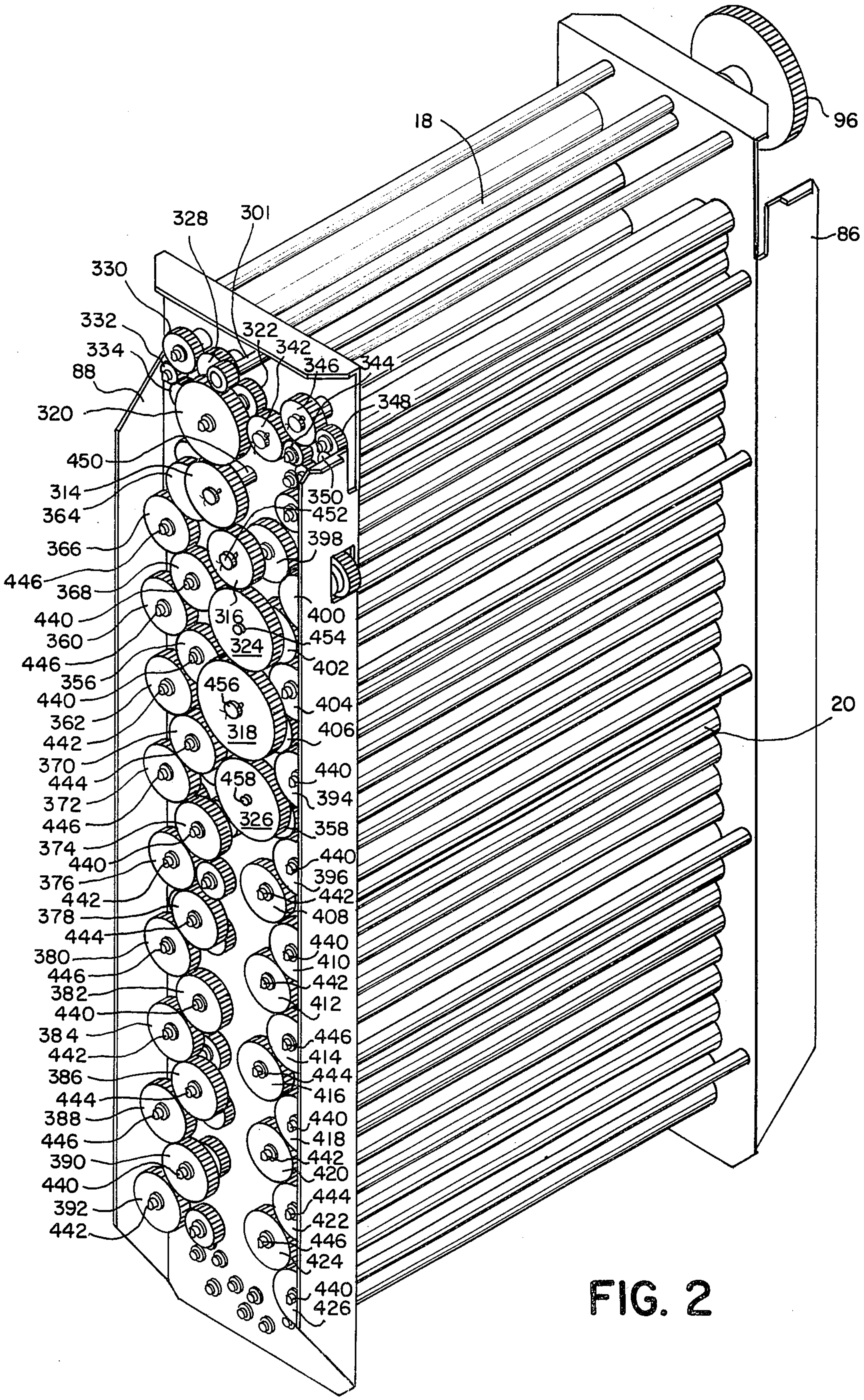
FIG. 2 is a perspective view of the rack of FIG. 1 viewed from the opposite side.
Figure 4:
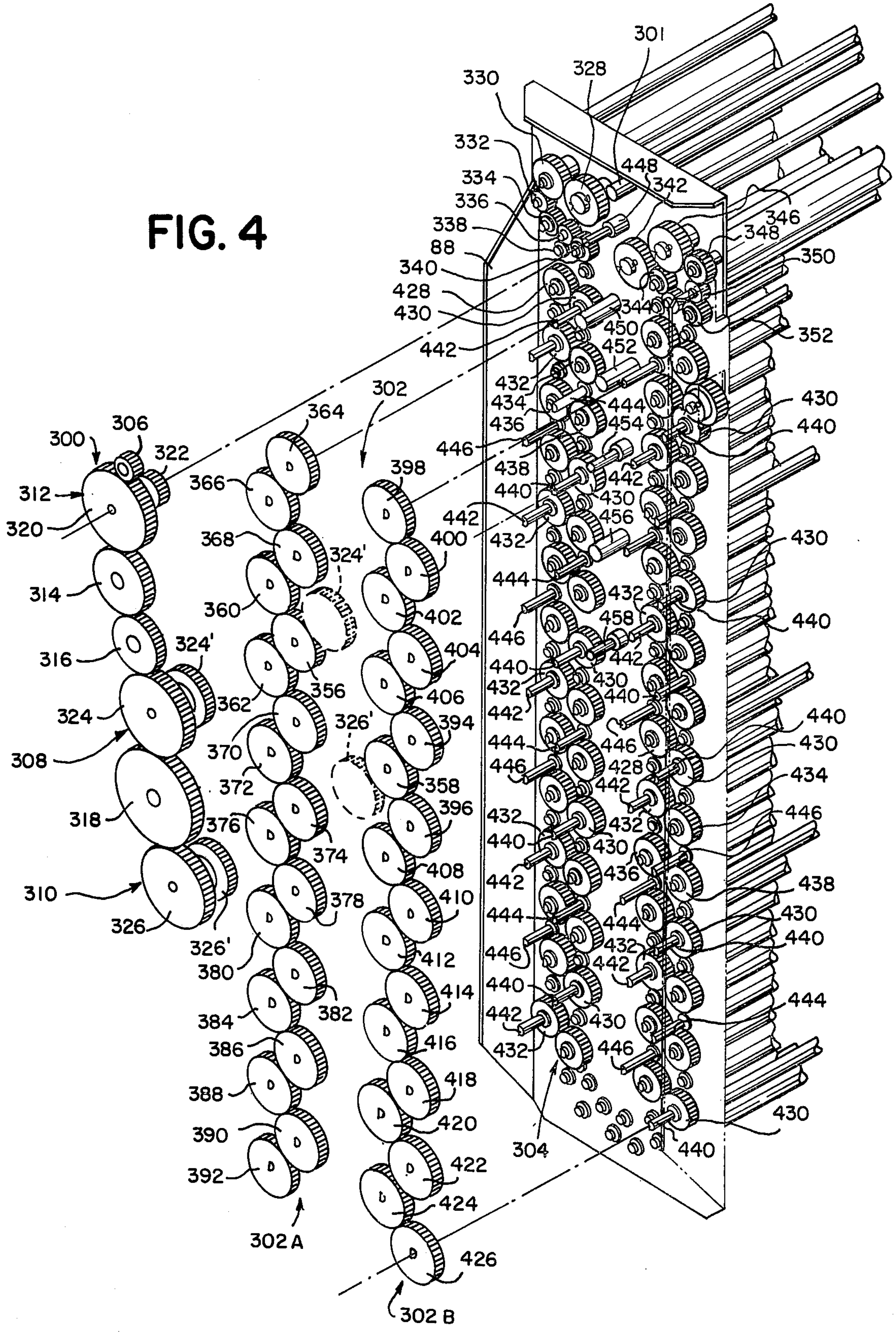
FIG. 4 shows a portion of the same rack viewed as in FIG. 2 with parts exploded to show the layers of gears comprising another portion of the power transmitting system.

Referring now to FIGS. 2, 4, 8, 9 and 10, the drain side of the transport roller rack 10 will now be described. As best seen in FIGS. 2 and 4, the gearing arrangement at the drain frame member 88 is similar in design and function to the gearing arrangement at the drive frame member 86 as hereinbefore described. The drain side gear system comprises generally three layers of tiers of gears, namely an outer layer 300 comprising a plurality of large diameter power gears which mesh to transport power through the upper portion of the rack. An intermediate layer or tier of gears 302 underlies the outer layer 300 and comprises a pair of generally similar, spaced gear trains designated 302A, 302B to respectively transmit rotative power to the groups of outer row roller, 18 and inner row rollers 20 which form respectively the inlet leg and the outlet leg of the U-shaped film transport path through the rack 10. Underlying the intermediate layer of gears 302 is the inner layer of gears 304 which comprises essentially smaller roller driving gears which gears are arranged in meshing pairs. Some of the pairs of roller driving gears are driven from power derived from the opposite or drive side frame member 86 as hereinbefore described.

As best seen in FIGS. 2 and 4, power to the drain side gear system is supplied through the main power gear shaft 301 to which the drain side pinion 306 is affixed. The drain side power drive comprises the coaxial large diameter power gears 308, 310 in combination with the intermediate reversing and other associated gears 312, 314, 316 and 318. The upper power drive gear 312 is fabricated as a coaxial gear comprising an outer gear 320 and an inner gear 322, as seen in FIG. 4. As also seen in that figure, the same is true for gear 308 with its outer power gear 324 and inner cluster drive gear 324', and for gear 310 with its outer power gear 326, and inner cluster drive gear 326'. As shown in FIG. 12 for gears 324 and 324', for example these gear arrangements may be of unitary construction, consisting of a single, molded plastic body.

Inasmuch as all of the gears driving the bottom turnaround rollers 59, 60, 62, 64, 66, 68, 70, 72, 74, 76, 78, 90, 82 and 84 are drive from power supplied at the drive side frame member 86, it has been found that only two power taps offs at the respective cluster drive gears 324', 326' are required at the drain side frame member 88 to adequately drive the system. Accordingly, as the turnaround roller system is powered from the drive side 86, the outer layer of gears 300 at the drain side need not extend the full length of the rack in the manner illustrated in the outer layer 90 but may be abbreviated as illustrated in FIGS. 2 and 4. Through the coaxial connection between each power gear 324', 326' which it respectively rotates, there is tapped off a portion of the power flowing down the outer layer 300 of gears. The tapped portions of the power are applied by the cluster drive gears 324', 326' to the other gears comprising the inner layer 304 for roller rotative purposes. It will be noted that the cluster drive gears 324', 326' do not directly drive any of the transport rollers. Rather, they transmit the power tapped off from the respective power transmitting gears 324, 326, through meshing, to other gears in the intermediate layer of gears 302 which in turn drive gears which drive the transport rollers 18, 20.

Figure 9:
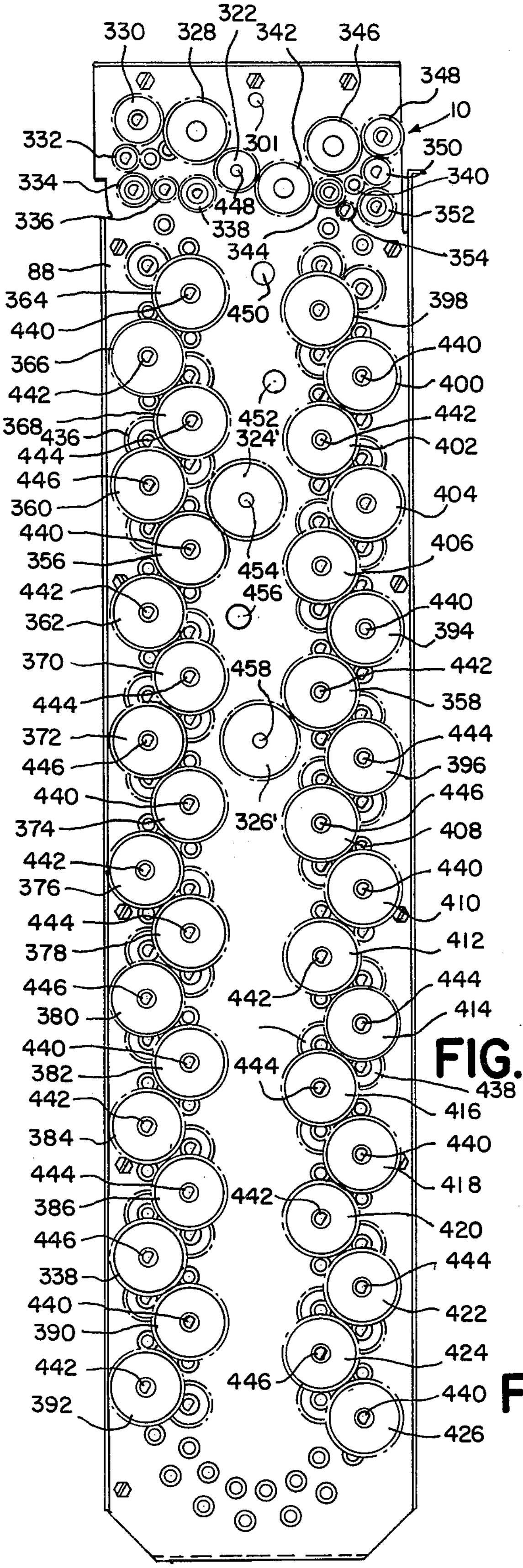
FIG. 9 is a side elevational view of the rack of FIG. 8 showing the underlying gear configuration with the large, power transmitting gears removed.

Referring now to FIGS. 4 and 9, it will be noted that the upper cluster drive gear 324' meshes with the intermediate gear 356 and the lower cluster drive gear 326' meshes with the intermediate gear 358. Thus, it is seen from the power tapped from the power transmitting gears in the outer tier 300 is applied to the intermediate layer 302 at two spaced locations. One gear, namely, the cluster drive gear 324' is in mesh with the upfeed or outlet side of the rack. The other intermediate cluster drive gear 326' is in mesh with the inlet or downfeed side of the roller system.

Still referring to FIGS. 4 and 9, it will be noted that the meshed intermediate gear 356 in turn meshes directly with intermediate gears 360, 362 and indirectly with intermediate gears 364, 366, 368, 370, 372, 374, 376, 378, 380, 382, 384, 386, 388, 390 and 392, which gears generally comprise the outlet leg 302A of the intermediate layer 302. Similarly, the meshed intermediate gear 358 meshes directly with intermediate gears 394 and 396 and indirectly with the intermediate gears 398, 400, 402, 404, 406, 408, 410, 412, 414, 416, 418, 420, 422, 424, and 426 which intermediate gears form the inlet side 302B of the intermediate layer 302.

Accordingly, as the drain side pinion 306 is powered by the main drive gear 96 through the shaft 301 to rotate the large power gears 324, 326, the cluster drive gears 324', 326' will be coaxially rotated to rotate all of the intermediate gears comprising the intermediate layer 302. Thus, it is seen that rotation of the main power train comprising the power gears which are situated in the outer layer 300 acts to supply power to all of the gears comprising the intermediate layer 302 in two separate, distinct, spaced locations through meshing of the coaxial cluster drive gears 324', 326'.

Figure 10:
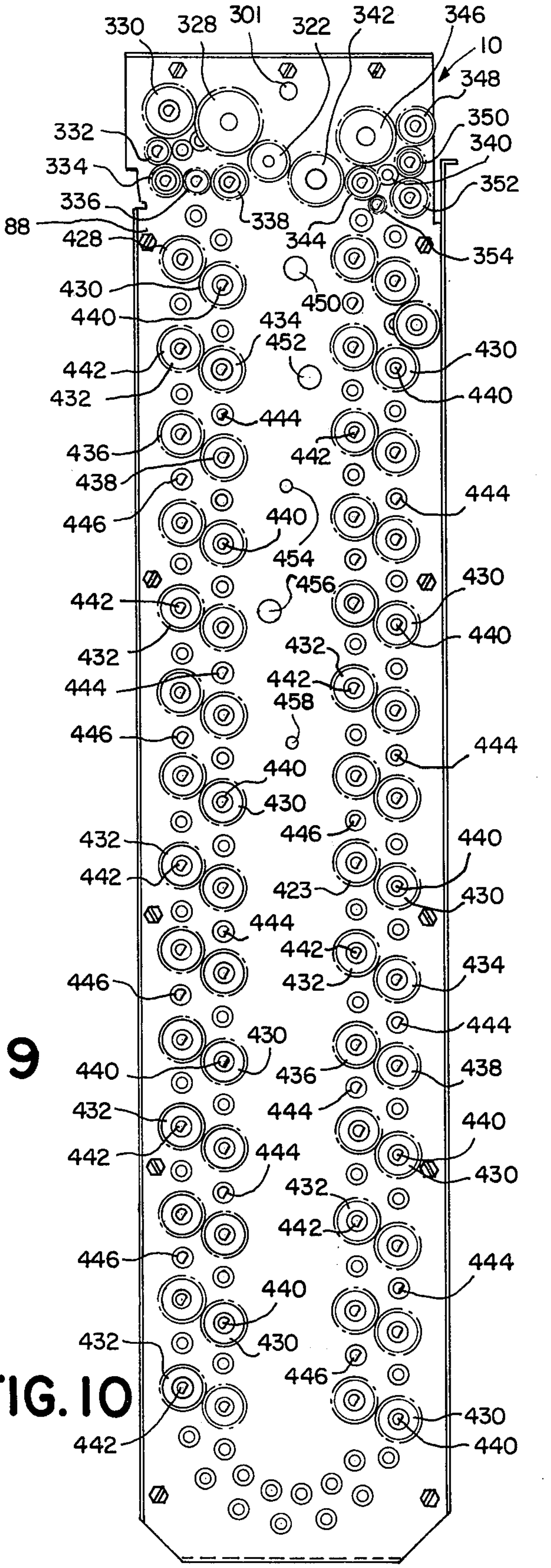
FIG. 10 is a side elevational view of the rack of FIG. 8 showing the underlying gear configuration with the first and second layers of gears removed.

Referring now to the inner layer of gears 304, as best seen in FIGS. 4 and 10, it will be noted that specified pairs of roller drive gears will be provided with one extended roller drive gears shaft which shaft in turn is rotated by one of the intermediate layer gears. Specifically, the roller drive gears are arranged in meshed gear pairs 428, 430; 432, 434; 436, 438. It will be noted that the meshed roller gear pairs 428, 430 and 432, 434, respectively include a shaft extension 440 and 442 for rotation by certain of the gears comprising the intermediate gear layer 302. The pair of roller gears 436, 438 have no shaft extension, but rather are driven from power supplied by the opposite or drive side power train.

The shafts 440 extending from the respective roller drive bears 430, are rotated by the respective intermediate gears 364, 356, 374, 382, 390, 400, 394, 410, 418 and 426.

Similarly, the shafts 442 extending from the respective left roller drive gears 432 of the meshed gear pairs 432, 434, extend sufficiently to carry an intermediate gear and to be rotated thereby, namely, the intermediate gears 366, 362, 376, 384, 392, 402, 358, 412, and 420.

Thus, it is seen that each left gear 432 of each roller gear pair 432, 434 and each right gear 430 of each roller gear pair 428, 430 is coaxial with a larger gear forming part of the intermediate gear layer 302 and is coaxially rotated thereby. Accordingly, the intermediate gears which coaxial on the respective shafts 440 serve as smaller power gears to coaxially transmit power to the roller drive gears 430, which gears then serve as small cluster drive gears. Similarly, certain of the intermediate gears coaxially transmit power to the left roller drive gears 432 through the shafts 442, which gears then also serve as small cluster drive gears. The remaining gears comprising the intermediate layer 302 are not coaxial with roller drive gears and respectively rotate about shafts 444, 446 which extend outwardly from the drain side frame member 88.

Still referring to FIGS. 4 and 9, it will be observed that the drain side frame member 88 carries a plurality of generally centrally positioned shafts 448, 450, 452, 454, 456, and 458, which shafts respectively journal the gears comprising the power drive or outer layer 300 namely the gears 312, 314, 316, 308, 318 and 310.

The greatly increased number of rollers of the present invention is precluded from imposing undue strain on the rack driving mechanism by virtue of the driving gear system comprising the three tiers of inter-connected power gears, cluster drive gears, and clusters of roller driving gears which characterizes the present invention. Not only does the efficiency of this system more than offset the added load of the extra rollers (and their individual driving gears, but chatter and vibration in the drive system are simultaneously so markedly reduced that the danger of film blemishes due to uneven rack movement is substantially eliminated.

The staggered roller configuration substantially frees the rollers from adherence to close dimensional tolerances, as is necessary to avoid damage to the film when nip-forming configurations are used. It also provides full guidance for the film through the rack without additional guides or vanes. This is particularly advantageous to minimize the possibility of film damage while being transported through the path defined by the transport rollers.

It will be understood that various modifications of the transport roller rack are possible without departing from the scope of the present invention.

For example, the transport roller rack need not necessarily be positioned vertically, but may be otherwise positioned such as on an incline, depending on the overall design of the developing machine. The height of the rack, the number of rollers, sizes of rollers, and so forth, can be varied to suit the individual requirements. Likewise, the details of the gear drive system can be varied, including the number of power gears and cluster drive gears, the specific diameter relationship between power gears, the cluster drive gears and roller gears and so forth.

We claim:

1. A transport roller rack for transporting webs, such as photographic films, comprising:
   a plurality of transport rollers positioned in a staggered pattern without forming nips, each roller having a roller driving gear at its end, and alternate pairs of adjacent rollers rotating in the same direction having their driving gears at opposite sides of the rack and in mesh with each other,
   a plurality of intermediate power gears of larger pitch diameter than the roller driving gears driving each other by meshing, selected ones of the intermediate power gears coaxially rotating selected ones of the roller driving gears in different pairs, and
   a plurality of main power gears driving each other through meshing, selected ones of said main power gears coaxially rotating main cluster drive gears of smaller pitch diameter which in turn rotate intermediate power gears through meshing.

2. The rack of claim 1 wherein
   consecutive rollers rotating in the same direction are spaced so closely together that gears mounted at their adjacent ends and having the pitch diameter of roller driving gears would interfere with one another.

3. The rack of claim 1 wherein
   consecutive rollers positioned on either side of the film being transported are spaced apart by a distance which is no greater than the spacing between consecutive rollers positioned diagonally with respect to each other across the film.

4. The rack of claim 1 wherein power is supplied to the rack at one of the main power gears.

5. The rack of claim 1, which comprises intermediate power gears at both sides of the rack.

6. The rack of claim 5 wherein
   some of the roller driving gears at one side of the rack are coaxially rotated by intermediate power gears at the opposite side of the rack.

7. The rack of claim 6 wherein the remaining roller driving gears at the one side of the rack are coaxially rotated by intermediate power gears at the same side of the rack.

8. The rack of claim 7 wherein the intermediate power gears at one side of the rack coaxially rotate roller driving gears positioned following a knights-move pattern along the staggered rollers.

9. The rack of claim 8 wherein two consecutive intermediate power gears coaxially rotate roller driving gears at one side of the rack and the third consecutive intermediate power gear coaxially rotates a roller driving gear at the opposite side of the rack.

10. The rack of claim 5 which comprises main power gears at both sides of the rack.

11. The rack of claim 10 wherein the power for driving the entire rack is applied to one main power gear at one side of the rack.

12. The rack of claim 1 wherein the main power gears are positioned in a first tier, the main cluster drive gears and the intermediate power gears are positioned in a second tier; and the roller driving gears are positioned in a third tier.

13. The rack of claim 12 wherein there are first, second and third tiers of gears at each side of the rack, with power transfer from one side of the rack to the other.

14. The rack of claim 12 wherein the first tier of gears is positioned farthest from the rollers and the third tier is positioned closest to the rollers.

15. The rack of claim 1 further comprising nip-forming roller pairs at each end of the film path for automatically introducing films into and removing films from the rack.

16. The rack of claim 1 wherein the plurality of rollers are positioned in two generally parallel strings.

17. The rack of claim 16 wherein the strings are generally vertical with film turnabout means at the bottom.

18. The rack of claim 17 wherein staggered intermediate power gears extend along each vertical roller string.

19. The rack of claim 18 wherein the main cluster drive gears rotate through meshing the intermediate power gears extending along both vertical roller strings.

20. The rack of claim 1 wherein at least some of the main power gears and the main cluster drive gears coaxially rotated thereby are of unitary construction.

21. The rack of claim 20 wherein the unitary construction consists of a single, molded plastic body.

* * * * *